United States Patent [19]

Quinn et al.

[11] Patent Number: 5,338,521

[45] Date of Patent: Aug. 16, 1994

[54] PROCESS FOR REVERSIBLY ABSORBING ACID GASES FROM GASEOUS MIXTURES

[75] Inventors: Robert Quinn, East Texas; Guido P. Pez, Allentown; John B. Appleby, Lansdale, all of Pa.

[73] Assignee: Air Products and Chemicals, Inc., Allentown, Pa.

[21] Appl. No.: 973,897

[22] Filed: Nov. 10, 1992

[51] Int. Cl.$^5$ ............... B01D 47/00; C01B 17/16; C01C 3/00; B01J 8/00
[52] U.S. Cl. .................. 423/210.5; 423/220; 423/230; 423/243.06; 423/244.01; 423/242.2
[58] Field of Search ............. 423/230, 210.5, 244.01, 423/243.06, 242.2, 220

[56] References Cited

U.S. PATENT DOCUMENTS 4,944,934  7/1990  Dunbobbin et al. .......... 423/210.5
4,973,456 11/1990  Quinn et al. ................. 423/210.5

*Primary Examiner*—Michael Lewis
*Assistant Examiner*—Wendy Lovern
*Attorney, Agent, or Firm*—Keith D. Gourley; James C. Simmons; William F. Marsh

[57] ABSTRACT

A process is disclosed for reversibly absorbing acid gases from gaseous mixtures wherein a salt hydrate is heated to a temperature above its melting point and exposed to an acid gas which is absorbed by the salt hydrate to form a salt hydrate melt. This melt is thereafter cooled to a temperature sufficient to solidify the melt and to desorb the acid gas from the solidified salt hydrate. Preferred salt hydrates include tetramethylammonium fluoride tetrahydrate and tetraethylammonium acetate tetrahydrate.

13 Claims, No Drawings

PROCESS FOR REVERSIBLY ABSORBING ACID GASES FROM GASEOUS MIXTURES

FIELD OF THE INVENTION

The present invention relates to a process for removing acid gases such as $CO_2$ and $H_2S$ from gaseous mixtures, and more particularly, to a process for reversibly absorbing acid gases from gaseous mixtures which utilizes various salt hydrates as absorbents.

BACKGROUND OF THE INVENTION

Current commercial processes for separating acid gases such as $CO_2$ and $H_2S$ from gaseous mixtures containing these acid gases typically utilize chemical absorbents such as amines or aqueous salt solutions. A variety of amines, mostly alkanolamines, are used as $CO_2$ absorbents to separate $CO_2$ from mixtures containing other gases. Suitable alkanolamines which can be used for removing $CO_2$ from gaseous mixtures include monoethanolamine, diethanolamine, diglycolamine, diisopropanolamine and triethanolamine.

The above-mentioned primary and secondary amines react with $CO_2$ to form carbamates. Carbamates are relatively stable but upon heating, the $CO_2$ can be desorbed thereby regenerating the $CO_2$-free absorbent. Typical heats of reaction of amines with $CO_2$ are on the order of 10–20 kcal/mole $CO_2$, which is relatively high. In contrast, tertiary amines do not form carbamates, but instead, generate hydroxide in aqueous solutions wherein the hydroxide subsequently reacts with $CO_2$ to give $HCO_3^-$ and/or $CO_3^{2-}$. Since the heats of reaction of $CO_2$ with tertiary amines are less than those involving primary and secondary amines, less energy is needed to desorb $CO_2$ from tertiary amine solutions.

Various processes have been developed for absorbing $CO_2$ and $H_2S$ which utilize solutions of strongly alkaline salts. The most commonly used solutions contain sodium and potassium carbonate, phosphate, borate, arsenite and phenolate, with potassium carbonate perhaps being preferred. Catalysts are known to increase the activity of alkaline salt solutions with respect to the rate of absorption and desorption of $CO_2$.

Sterically hindered amines have been used to remove gases such as $CO_2$ and $H_2S$ from gaseous streams. As the structure of amines become more sterically hindered, the carbamate becomes increasingly less stable. Moderately hindered amines are characterized by high rates of $CO_2$ absorption and high capacities for $CO_2$ while severely hindered amines are typically characterized by low rates of $CO_2$ absorption and higher than standard capacities and selectivities for removing $H_2S$ from gaseous streams containing $CO_2$.

U.S. Pat. No. 4,973,456 issued Nov. 27, 1990 to Quinn et al. discloses a process for using salt hydrates as reversible absorbents to remove $CO_2$, $H_2S$ and other acid gases from gas streams. The absorption and desorption steps may be performed at the same temperature. Additionally, absorbed gas may be desorbed from the absorbent by lowering the gas pressure above the melt or by heating, although heating is not essential. The absorbent is a liquid at operating temperature and the gas is desorbed from the absorbent by lowering the $CO_2$ pressure above the melt.

U.S. Pat. No. 4,944,934 issued Jul. 31, 1990 to Dunbobbin et al. discloses a process for separating oxygen from air by reversible chemical absorption at a significantly elevated temperature, e.g., 630° C. to 870° C., and desorption at a lower elevated temperature, e.g., 370° C. to 500° C. The chemical absorbent, which is utilized in a slurry state, is a vanadium bronze.

SUMMARY OF THE INVENTION

The invention provides a process for removing one or more acid gases from a gaseous mixture containing such acid gases, which process comprises contacting a gaseous mixture containing one or more acid gases with a salt hydrate at a temperature at or above the melt temperature of the salt hydrate whereby the salt hydrate reversibly absorbs a portion of the acid gases from the gaseous mixture.

The invention also provides a process for reversibly absorbing one or more acid gases from a gaseous mixture containing one or more acid gases comprising contacting the gaseous mixture with a salt hydrate at a temperature at or above the melt temperature of the salt hydrate to form a salt hydrate melt wherein a portion of the acid gases are absorbed into the salt hydrate and cooling the salt hydrate melt to a temperature sufficient to solidify the salt hydrate and to desorb the acid gases from the solidifying salt hydrate.

DETAILED DESCRIPTION OF THE INVENTION

The present invention employs salt hydrates as reversible absorbents to remove acid gases such as $CO_2$, $H_2S$ and COS from gaseous mixtures containing such acid gases. The invention is particularly suited toward removing $CO_2$ and $H_2S$ from gaseous mixtures. The salt hydrates employed in the present invention exhibit high acid gas sorption capacities at relatively low operating temperatures and provide a simple and efficient alternative to absorbents used in current acid gas absorption processes.

A novel feature of the present invention resides in the ability of the enumerated salt hydrates to absorb acid gases at a temperature at or above the melt temperature of the salt hydrates and to desorb the acid gases at a lower temperature, namely at or below the temperature at which the salt hydrate solidifies and ejects or desorbs the acid gases.

The present process is very unique and represents a departure from prior art processes in that the temperature regimes utilized to absorb and desorb the acid gases are opposite to those practiced in typical prior art processes. While prior art processes require heating the loaded absorbent to desorb the acid gases, the present invention requires the loaded absorbent to be cooled to a temperature at which the salt hydrate begins to solidify in order to desorb the acid gases. Therefore, the absorption temperature is higher than the desorption temperature and acid gases are desorbed only if the temperature is decreased to at or below the solidification temperature of the salt hydrate.

Typically, a salt is defined as a substance comprised of cations and anions and characterized by overall electrical neutrality. A salt hydrate is a salt which contains bound water. The composition of a salt hydrate is usually represented by a formula of the form $A_x^{m+} B_y^{n-} \cdot r\text{-}H_2O$ where $A^{m+}$ is a cation and $B^{n-}$ is the conjugate base of a weak acid, which for the purpose of this invention, typically has a pKa corresponding to an ionization constant of the acid greater than 3 as measured in dilute aqueous solution, m and n are independently integers from 1–4, x and y are integers such that the ratio of x to y provides a neutral salt, and r is the number of moles of water bound per mole of salt which for most salt hydrates will range between 0.5 and 24 and is typically up to 6 moles of water per mole of cation and independently up to 6 moles of water per mole of anion present in the salt.

The term salt hydrate does not indicate the manner or degree of tenacity by which water molecules are bound to the salt. Many salts exist as hydrates and, upon heating, melt to yield liquids which contain bound water. Such systems are known as "molten salt hydrates" or "hydrate melts" which are included under the general term "salt hydrate" as the term is used herein. Examples of substances which yield molten salt hydrates are $MgCl_2.6H_2O$, $Ca(NO_3)_2.4H_2O$ and $CaCl_2.6H_2O$. There are also salt hydrates which are liquids at room temperature and solidify below room temperature. Examples of salt hydrates which are liquids at room temperature include $KF.4H_2O$, $NaHS.3H_2O$, $AlBr_3.15H_2O$, $Na_2MnO_4.10H_2O$, $KV(SO_4)_2.12H_2O$ and $CsGe(SO_4)_2.12H_2O$.

Salt hydrates suitable for practicing the present invention include any salt hydrate which is capable of absorbing an acid gas at a temperature at or above its melting point to form a salt hydrate melt, namely a solution of the salt hydrate into which the acid gases are absorbed, and which is capable of desorbing the acid gases upon cooling the salt hydrate melt to a temperature at or below the temperature in which the salt hydrate solidifies and desorbs or ejects the acid gases. Therefore, salt hydrates which do not absorb acid gases at temperatures at or above the melting point of the salt hydrate are not part of this invention. Likewise, salt hydrates which absorb acid gases at temperatures at or above the melting point of the salt hydrate but are not capable of desorbing such acid gases upon cooling to a temperature sufficient to solidify the salt hydrate are not considered as part of this invention.

Salt hydrates containing fluoride ions or the anions of certain carboxylic acids have been found to reversibly absorb large quantities of acid gases under the enumerated temperature cycling. Representative salt hydrates include, but are not limited to, various hydrates of tetramethylammonium fluoride (TMAF) and tetraethylammonium acetate (TEAA) such as $TMAF.3H_2O$, $TMAF.4H_2O$, $TMAF.6H_2O$, $TEAA.4H_2O$ and $TEAA.6H_2O$. For purposes of interpreting the present invention, the names of the salt hydrates have been abbreviated by the abbreviations, TMAF and TEAA, followed by the number of equivalents of water absorbed by the salt. Preferred absorbents for practicing the present process are tetramethylammonium fluoride tetrahydrate ($TMAF.4H_2O$) and tetraethylammonium acetate tetrahydrate ($TEAA.4H_2O$).

For example, tetramethylammonium fluoride tetrahydrate ($TMAF.4H_2O$), which has a melting point of 39° C.–42° C., absorbs 0.28 moles of $CO_2$ per mole of salt (equivalents) at 50° C. and at a gas pressure of about 100 kPa, corresponding to a calculated $CO_2$ concentration of about 1.9M. This calculation is based on the assumption that the densities of liquid and solid TMAF are approximately the same and that the absorbent volume is unchanged by dissolution of $CO_2$.

Likewise, salt hydrates containing the anions of a weak acid also exhibit high $CO_2$ absorption capabilities. For example, tetraethylammonium acetate tetrahydrate ($TEAA.4H_2O$), which has a melting point of 42° C.–46° C., absorbs 0.174 equiv $CO_2$ at 50° C. and a pressure of 146 kPa. The quantity of $CO_2$ absorbed at 50° C. by both $TMAF.4H_2O$ and $TEAA.4H_2O$ is far in excess of that obtained for a normal aqueous salt solution or for water. The $CO_2$ absorption capabilities of other salt hydrates are described in U.S. Pat. No. 4,973,465, which is hereby incorporated by reference.

In the present invention, the salt hydrate is heated to a temperature at or above its melting point to produce a melt. Depending on the salt hydrate being utilized, this temperature can range from about 0° C. to about 200° C. However, when the salt hydrate is $TMAF.4H_2O$ or $TEAA.4H_2O$, it is heated to a temperature of between about 40° C. to about 60° C. and preferably to a temperature of about 50° C.

After the salt hydrate has been liquified by heating, the melt is then exposed to a gaseous mixture containing the acid gases to be reversibly absorbed. The acid gases are absorbed until equilibrium is reached. Once an equilibrium quantity of acid gases is absorbed, the temperature is reduced at least until solidification of the melt occurs. The onset of solidification of the melt is accompanied by desorption and ejection of the bulk of the acid gases. This temperature dependent absorption/desorption behavior is fully reversible and the solidified absorbent can be used again to absorb additional acid gases by heating the salt hydrate to at or above its melt temperature.

In prior art processes, desorption of acid gases from a typical acid gas absorbent is usually accomplished by heating the loaded absorbent. Thus, the absorption temperature employed in prior art processes is lower than the desorption temperature. The unique feature of the present invention is that the acid gas is desorbed only if the temperature is reduced to a temperature at or below the solidification temperature of the salt hydrate. Thus, the absorption temperature is higher than the desorption temperature. This desorption of the acid gas upon solidification of the absorbent was completely unexpected.

The present invention provides a more efficient way of desorbing the acid gas than the previous methods which required heating the absorbent. The only energy input required is the heat of fusion to melt the absorbent and this occurs at a relatively low temperature. Melting of the absorbent can be accomplished using low grade heat while high grade steam is required to regenerate an amine scrubber. Further, the present invention is more energy efficient than previous absorption/desorption procedures due to the narrow temperature range over which absorption and desorption occur.

The following examples are provided to better illustrate the present invention and are not to be regarded as limiting the scope of the appended claims.

EXPERIMENTAL SECTION

The acid gas absorption/desorption data for various salt hydrates was determined using manometric techniques. The salt of interest was weighted into a stainless steel reaction vessel and attached to a vacuum line of known volume. Dead volume of the system was determined by expansion of helium from the line at known volume and pressure into the reaction vessel. The vapor pressure of water above the salt hydrate was determined by exposing the solid or melt to a static vacuum and allowing the pressure to reach a maximum level. The vapor pressure was assumed to remain constant throughout the experiment and subsequent $CO_2$ or $H_2S$ pressures were corrected accordingly.

The line was then charged with $CO_2$ or $H_2S$ to a known pressure and opened to the reaction vessel which was maintained at a constant temperature. The pressure was monitored until no further decrease was observed. The temperature of the reactor was then lowered by the use of a cooling bath or by simply removing the heating source and pressure changes were monitored.

EXAMPLE 1

TEAA.4H$_2$O FOR CO$_2$ ABSORPTION AND DESORPTION

A sample of molten TEAA.4H$_2$O at 50° C. in a stainless steel reactor was exposed to $CO_2$ and allowed to come to equilibrium. The sample absorbed 0.148 equivalents (equiv.) $CO_2$ at a pressure of 102.3 kPa. The sealed system was then cooled to room temperature and a pressure increase corresponding to desorption of gas began at about 32° C. and was accompanied by an increase in temperature, presumably due to the solidification of the melt and the heat of crystallization associated with this solidification. The final pressure at 22° C. was 184.6 kPa. This corresponds to a desorption of 0.121 equiv. $CO_2$ which translates to 0.027 equiv. remaining in the absorbent. Reheating to 50° C. resulted in a pressure of 101.2 kPa or 0.150 equiv. absorbed by the melt. Cooling to room temperature 22° C. resulted in a pressure of 185.1 kPa. Thus, the temperature dependent absorption/desorption behavior is fully reversible.

EXAMPLE 2

TMAF.4H$_2$O FOR CO$_2$ ABSORPTION AND DESORPTION

A sample of TMAF.4H$_2$O at 50° C. was exposed to $CO_2$ and at equilibrium the pressure was 125.4 kPa, corresponding to an absorption of 0.328 equiv. $CO_2$. The temperature was decreased incrementally and between 50° C. and 5° C. the sample absorbs more $CO_2$ as the pressure decreases. Between 5° C. and 0° C. an increase in pressure was observed, which is presumably accompanied by solidification of the melt. The final pressure at 0° C. was 200 kPa corresponding to a desorption of 0.259 equiv. $CO_2$, which translates to 0.069 equiv. $CO_2$ remaining in the absorbent.

EXAMPLE 3

TMAF.3H$_2$O FOR CO$_2$ ABSORPTION AND DESORPTION

A sample of TMAF.3H$_2$O at 50° C. was exposed to a pressure of $CO_2$ and at equilibrium the pressure was 110.8 kPa, corresponding to the absorption of 0.379 equiv. $CO_2$. The temperature was decreased incrementally and at 0° C., the pressure was 104.9 kPa, corresponding to the absorption of 0.397 equiv. $CO_2$. The sample was further cooled to −15° C. which resulted in an increased pressure of 116.8 kPa and an absorption of 0.316 equiv. $CO_2$. Thus, TMAF.3H$_2$O liberates a relatively small fraction (0.063 equiv.) of its bound $CO_2$ upon cooling to −15° C.

EXAMPLE 4

TMAF+6H$_2$O FOR CO$_2$ ABSORPTION AND DESORPTION

A sample of TMAF.6H$_2$O at 50° C. was exposed to a pressure of $CO_2$. At equilibrium, the pressure was 126.9 kPa, corresponding to the absorption of 0.171 equiv. $CO_2$. The temperature was decreased to 0° C. resulting in a pressure of 121.3 kPa and the absorption of 0.175 equiv. $CO_2$. A decrease in temperature to −15° C. resulted in an increase of pressure to 157.3 kPa and an absorption of $CO_2$ of 0.041 equiv. $CO_2$, or a net desorption of 0.130 equiv. of $CO_2$ by cooling from 50° to −15° C.

EXAMPLE 5

TEAA+6H$_2$O FOR CO$_2$ ABSORPTION AND DESORPTION

A sample to TEAA+6H$_2$O at 50° C. was exposed to a pressure of $CO_2$. At equilibrium, the pressure was 124.9 kPa, corresponding to the absorption of 0.100 equiv. $CO_2$. The temperature was lowered to 0° C. and this resulted in a pressure of 139.8 kPa and an absorption of 0.038 equiv. $CO_2$. The temperature was further decreased to −15° C. which resulted in a pressure of 139.2 kPa and an absorption of 0.034 equiv. $CO_2$, or a net desorption of 0.066 equiv. $CO_2$ by cooling from 50° to −15° C.

EXAMPLE 6

TEAA.4H$_2$O FOR H$_2$S ABSORPTION AND DESORPTION

A sample of TEAA.4H$_2$O at 50° C. was exposed to $H_2S$ at an equilibrium pressure of 91.8 kPa and a corresponding absorption of 0.298 equiv. $H_2S$. The sample was cooled incrementally and a decrease in pressure corresponding to gas absorption was observed to 26° C. At a temperature between 24° C. and 25° C., an increase in pressure was observed, presumably accompanied by solidification of the melt. This increase in pressure corresponded to a desorption of 0.149 equiv. $H_2S$. Further cooling to 10° C. resulted in a final absorption of 0.086 equiv. $H_2S$, or a net desorption of 0.212 equiv. $H_2S$.

EXAMPLE 7

TEAA.4H2O FOR CO$_2$ ABSORPTION AND DESORPTION AT HIGH PRESSURES

A sample of TEAA.4H$_2$O at 50° C. was exposed to a high pressure of $CO_2$. At 1140 kPa, 0.298 equiv. $CO_2$ were absorbed. Cooling to 20° C. in 10° C. increments resulted in a decrease in pressure to 1076 kPa and an absorption of 0.454 equiv. $CO_2$. At 10° C., an increase in pressure to 1154 kPa occurred, corresponding to desorption of 0.335 equiv. $CO_2$ (0.119 equiv. $CO_2$ remain absorbed). Additional cooling to −15° C. resulted in no further desorption. Thus, desorption upon cooling was observed at these higher $CO_2$ pressures, but the temperature required for this desorption is lower than the temperatures in the previous examples.

EXAMPLE 8

TMAF.4H$_2$O FOR CO$_2$ ABSORPTION AND DESORPTION AT HIGH PRESSURES

A sample of TMAF.4H$_2$O at 50° C. was exposed to a high pressure of $CO_2$. At 1629 kPa, the sample absorbed 0.433 equiv. $CO_2$. The temperature was then incrementally lowered to −20° C., but only a decrease in pressure was observed. At −20° C., the pressure was 1471 kPa. Thus, desorption of $CO_2$ from TMAF.4H$_2$O upon cooling to −20° C. is not observed at relatively high $CO_2$ pressures.

The following examples illustrate the activity of two commercial absorbents, monoethanolamine (MEA) and SELEXOL, under the previously discussed conditions.

EXAMPLE 9 (Comparative)

MEA FOR $CO_2$ ABSORPTION AND DESORPTION

A sample of MEA in the presence of 3.4 equiv. water, at 25° C., was exposed to a pressure of $CO_2$. The pressure at 25° C. was 79.3 kPa, corresponding to the absorption of 0.563 equiv. $CO_2$. The temperature was reduced to 0° C. which resulted in a pressure of 72.3 kPa. A further reduction of temperature to −15° C. resulted in a pressure of 66.5 kPa. This sample did not show an increase in pressure upon cooling, and the MEA was a solid at −15° C. Thus, no $CO_2$ was desorbed upon cooling to −15° C.

EXAMPLE 10 (Comparative)

SELEXOL FOR $CO_2$ ABSORPTION AND DESORPTION

A sample of SELEXOL absorbent, purchased from Norton Abrasives Co., was exposed to a pressure of $CO_2$. At 20° C., the pressure was 96 kPa, corresponding to an absorption of 0.069 equiv. $CO_2$. The temperature was reduced to −15° C. which resulted in a pressure of 84 kPa. The temperature was further reduced to −50° C. which resulted in a pressure of 75 kPa. The SELEXOL did not show an increase in pressure upon cooling, and was verified to be a solid at −50° C. Thus, no $CO_2$ was desorbed upon cooling to −50° C.

EXAMPLE 11

SELEXOL FOR $H_2S$ ABSORPTION AND DESORPTION

A sample of SELEXOL at 25° C. was exposed to a pressure of $H_2S$. At equilibrium, the pressure was 150 kPa with an absorption of 0.47 equiv. $H_2S$. The sample was then cooled incrementally to −20° C. Over this temperature range, only a decrease of pressure was observed with a final pressure of 75.0 kPa at −20° C. Thus, no desorption of $H_2S$ was observed at −20° C.

The present invention provides numerous advantages over prior art processes for reversibly absorbing acid gases. First, the absorbent does not have to be heated to desorb the acid gas and to regenerate the absorbent. Second, low-grade heat sources are sufficient to heat the salt hydrates to their melting temperatures whereas high grade steam is usually required to regenerate chemical absorbents of acid gases. Third, this invention can be used to recover an acid gas under pressure and no repressurization of the gaseous mixture is required as in conventional separation techniques.

The invention is not limited to the foregoing description. Variations and modifications will become apparent to those skilled in the art without departing from the spirit and scope of the present invention. Having thus described the present invention, what is now deemed appropriate for Letters Patent is set out in the following appended claims.

We claim:

1. A process for reversibly absorbing an acid gas from a gaseous mixture containing the acid gas, the process consisting essentially of:
    contacting the gaseous mixture with the salt hydrate at a temperature above the melt temperature of the salt hydrate melt into which a portion of the acid gas is absorbed; and
    cooling the salt hydrate melt to a temperature sufficient to solidify the salt hydrate melt and to desorb the acid gas from the solidifying salt hydrate.

2. The process of claim 1 wherein acid gas is selected from the group consisting of $CO_2$, $H_2S$ and COS.

3. The process of claim 2 wherein the gaseous mixture containing the acid gas is contacted with the salt hydrate at a temperature of between about 0° C. and 200° C.

4. The process of claim 3 wherein the gaseous mixture containing the acid gas is pressurized prior to contacting the gaseous mixture with the salt hydrate melt.

5. A process for reversibly absorbing an acid gas from a gaseous mixture containing the acid gas, the process consisting essentially of:
    contacting the gaseous mixture with a salt hydrate selected from the group consisting of tetramethylammonium fluoride trihydrate, tetramethylammonium fluoride tetrahydrate, tetramethylammonium fluoride hexahydrate, tetraethylammonium acetate tetrahydrate and tetraethylammonium acetate hexahydrate at a temperature above the melt temperature of the salt hydrate to form a salt hydrate melt onto which a portion of the acid gas is reversibly absorbed; and
    cooling the salt hydrate melt to a temperature sufficient to solidify the salt hydrate melt and to desorb the acid gas from the solidifying salt hydrate.

6. The process of claim 5 wherein the salt hydrate is tetramethylammonium fluoride tetrahydrate.

7. The process of claim 6 wherein the acid gas is contacted with the salt hydrate at a temperature of between about 40° C. and about 60° C.

8. The process of claim 7 wherein the gaseous mixture containing the acid gas is pressurized prior to contacting the gaseous mixture with the salt hydrate melt.

9. The process of claim 8 wherein the acid gas is selected from the group consisting of $CO_2$, $H_2S$ and COS.

10. The process of claim 5 wherein the salt hydrate is tetraethylammonium acetate tetrahydrate.

11. The process of claim 10 wherein the acid gas is contacted with the salt hydrate at a temperature of between about 40° C. and about 60° C.

12. The process of claim 11 wherein the gaseous mixture containing the acid gas is pressurized prior to contacting the gaseous mixture with the salt hydrate melt.

13. The process of claim 12 wherein the acid gas is selected from the group consisting of $CO_2$, $H_2S$ and COS.

* * * * *